United States Patent
Coon (10) Patent No.: US 9,774,839 B2
(45) Date of Patent: Sep. 26, 2017

(54) SYSTEMS AND METHODS FOR COLOR CORRECTION OF IMAGES CAPTURED USING A MOBILE COMPUTING DEVICE

(71) Applicant: GLASSES.COM INC., Mason, OH (US)

(72) Inventor: Jonathan Coon, Austin, TX (US)

(73) Assignee: Glasses.com Inc., Mason, OH (US)

( * ) Notice: Subject to any disclaimer, the term of this patent is extended or adjusted under 35 U.S.C. 154(b) by 404 days.

(21) Appl. No.: 14/015,821

(22) Filed: Aug. 30, 2013

(65) Prior Publication Data

US 2015/0062349 A1  Mar. 5, 2015

(51) Int. Cl.
   *H04N 17/00* (2006.01)
   *H04N 17/02* (2006.01)
   *H04N 9/73* (2006.01)

(52) U.S. Cl.
   CPC .................................. *H04N 9/735* (2013.01)

(58) Field of Classification Search
   USPC ......... 348/175, 164, 158, 135, 222.1, 223.1, 348/227.1, 49, 50, 77, 333.02, 366, 370, 348/371, 376, 564, 602, 714, 719, 771, 348/782, 801, 14.01, 189; 382/162, 164, 382/165, 166, 167, 254; 396/98, 109, 396/117, 124, 225, 429
   See application file for complete search history.

(56) References Cited

U.S. PATENT DOCUMENTS

| | | | | |
|---|---|---|---|---|
| 5,986,730 A | * | 11/1999 | Hansen | G02F 1/13362 349/117 |
| 8,354,639 B2 | * | 1/2013 | Jonsson | H04N 5/23293 250/330 |
| 8,976,236 B2 | * | 3/2015 | DeLand | A61B 19/5202 348/135 |
| 2003/0161501 A1 | * | 8/2003 | Park | G06T 3/0093 382/103 |
| 2003/0193564 A1 | * | 10/2003 | Jenkins | H04N 17/04 348/182 |
| 2004/0156554 A1 | * | 8/2004 | McIntyre | 382/254 |
| 2004/0201766 A1 | * | 10/2004 | Funston et al. | 348/333.02 |
| 2004/0240777 A1 | * | 12/2004 | Woodgate et al. | 385/16 |
| 2005/0122408 A1 | * | 6/2005 | Park et al. | 348/223.1 |
| 2005/0280847 A1 | * | 12/2005 | Cairns et al. | 358/1.9 |
| 2006/0067668 A1 | * | 3/2006 | Kita | 396/182 |
| 2006/0120707 A1 | * | 6/2006 | Kusakari | A61B 3/145 396/18 |
| 2007/0041096 A1 | * | 2/2007 | Nieuwkerk | G02B 5/08 359/485.07 |

(Continued)

*Primary Examiner* — Jefferey F Harold
*Assistant Examiner* — Mustafizur Rahman
(74) *Attorney, Agent, or Firm* — Holland & Hart LLP (57) ABSTRACT

A computer-implemented method for color correcting images captured using a mobile computing device is described. A wavelength of light is emitted from a display of a mobile computing device. An image of the emitted wavelength of light is captured using a camera on the mobile computing device. The image of the wavelength of light emitted from the display of the mobile computing device that is captured using the camera on the mobile computing device is analyzed. At least one image captured using the camera on the mobile computing device is modified based on the analysis of the image of the wavelength of light emitted from the display of the mobile computing device.

18 Claims, 7 Drawing Sheets

(56) References Cited

U.S. PATENT DOCUMENTS

| | | | |
|---|---|---|---|
| 2008/0106636 A1* | 5/2008 | Wernersson | 348/371 |
| 2008/0303922 A1* | 12/2008 | Chaudhri | H04N 5/235 |
| | | | 348/231.99 |
| 2008/0309852 A1* | 12/2008 | O'Donnell | G02F 1/133536 |
| | | | 349/74 |
| 2009/0059028 A1* | 3/2009 | Kollias | A61B 5/0071 |
| | | | 348/222.1 |
| 2009/0111512 A1* | 4/2009 | Demuynck | 455/556.1 |
| 2009/0124195 A1* | 5/2009 | Kamijoh et al. | 455/3.06 |
| 2009/0140980 A1* | 6/2009 | Morimoto | G06F 3/0325 |
| | | | 345/158 |
| 2009/0306484 A1* | 12/2009 | Kurtz | A61B 5/0059 |
| | | | 600/300 |
| 2009/0322215 A1* | 12/2009 | Sung et al. | 313/504 |
| 2010/0013812 A1* | 1/2010 | Gu | G06F 3/014 |
| | | | 345/207 |
| 2010/0066817 A1* | 3/2010 | Zomet | H04N 13/0404 |
| | | | 348/51 |
| 2010/0201823 A1* | 8/2010 | Zhang | H04N 5/2256 |
| | | | 348/164 |
| 2011/0090371 A1* | 4/2011 | Cote et al. | 348/237 |
| 2011/0128719 A1* | 6/2011 | Tracy et al. | 362/85 |
| 2011/0228096 A1* | 9/2011 | Friel | H04N 5/33 |
| | | | 348/164 |
| 2011/0273659 A1* | 11/2011 | Sobecki | B60R 1/088 |
| | | | 349/195 |
| 2011/0279630 A1* | 11/2011 | Friel | H04N 7/144 |
| | | | 348/14.08 |
| 2012/0007040 A1* | 1/2012 | Moon et al. | 257/13 |
| 2012/0019493 A1* | 1/2012 | Barnhoefer et al. | 345/207 |
| 2012/0150680 A1* | 6/2012 | Golus et al. | 705/26.5 |
| 2012/0188367 A1* | 7/2012 | Marcu | G01B 11/022 |
| | | | 348/135 |
| 2013/0015946 A1* | 1/2013 | Lau | G07C 9/00 |
| | | | 340/5.2 |
| 2013/0047238 A1* | 2/2013 | Hwang | H04L 9/3228 |
| | | | 726/7 |
| 2013/0086674 A1* | 4/2013 | Horvitz et al. | 726/19 |
| 2013/0088589 A1* | 4/2013 | Negoro | G01J 1/04 |
| | | | 348/135 |
| 2013/0157288 A1* | 6/2013 | Kilfeather et al. | 435/7.4 |
| 2013/0321769 A1* | 12/2013 | Kusumoto | A61B 3/1025 |
| | | | 351/206 |
| 2014/0292997 A1* | 10/2014 | Hung | H04N 9/735 |
| | | | 348/14.01 |
| 2015/0116530 A1* | 4/2015 | Lau | G07D 7/2008 |
| | | | 348/222.1 |

\* cited by examiner

SYSTEMS AND METHODS FOR COLOR CORRECTION OF IMAGES CAPTURED USING A MOBILE COMPUTING DEVICE

BACKGROUND

The use of computer systems and computer-related technologies continues to increase at a rapid pace. This increased use of computer systems has influenced the advances made to computer-related technologies. Indeed, computer devices have increasingly become an integral part of the business world and the activities of individual consumers. Computing devices may be used to carry out several business, industry, and academic endeavors.

In various situations, a user may capture an image using a mobile computing device. The light source for the image capture may vary from location to location. In one instance, the user may capture an image where the ambient light source includes incandescent bulbs. Alternatively, the user may capture an image where the ambient light source includes fluorescent lighting, light emitting diode (LED) lighting, daylight lighting, and the like. However, capturing images under certain ambient lighting may cause sensors in the camera of the mobile computing device to sense at least some colors incorrectly. As a result, benefits may be realized by providing systems and methods for color correction of images captured using a mobile computing device.

SUMMARY

According to at least one embodiment, a computer-implemented method for color correcting images captured using a mobile computing device is described. A wavelength of light may be emitted from a display of a mobile computing device. An image of the emitted wavelength of light may be captured using a camera on the mobile computing device. The image of the wavelength of light emitted from the display of the mobile computing device that is captured using the camera on the mobile computing device may be analyzed. At least one image captured using the camera on the mobile computing device may be modified based on the analysis of the image of the wavelength of light emitted from the display of the mobile computing device.

In one embodiment, the camera on the mobile computing device may be positioned in relation to a mirror in order to capture an image of the wavelength of light emitted from the display of the mobile computing device. The image of the user may be modified based on the analysis of the image of the emitted wavelength of light. A color pattern may be emitted from the display of the mobile computing device. In some embodiments, the emission of the color pattern may include emitting two or more wavelengths of light simultaneously. Alternatively, or additionally, the emission of the color pattern may include emitting two or more wavelengths of light in intervals and at least one wavelength of light per interval. The display of the mobile computing device may include a reflective display and/or a transflective display. The wavelength of light emitted from the display of the mobile computing device may be derived from an ambient light source.

A computing device configured to color correct images captured using a mobile computing device is also described. The device may include a processor and memory in electronic communication with the processor. The memory may store instructions that are executable by the processor to emit a wavelength of light from a display of a mobile computing device, capture an image of the emitted wavelength of light using a camera on the mobile computing device, analyze the image of the wavelength of light emitted from the display of the mobile computing device that is captured using the camera on the mobile computing device, and modify at least one image captured using the camera on the mobile computing device based on the analysis of the image of the wavelength of light emitted from the display of the mobile computing device.

A computer-program product to color correct images captured using a mobile computing device is also described. The computer-program product may include a non-transitory computer-readable medium that stores instructions. The instructions may be executable by a processor to emit a wavelength of light from a display of a mobile computing device, capture an image of the emitted wavelength of light using a camera on the mobile computing device, analyze the image of the wavelength of light emitted from the display of the mobile computing device that is captured using the camera on the mobile computing device, and modify at least one image captured using the camera on the mobile computing device based on the analysis of the image of the wavelength of light emitted from the display of the mobile computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Color temperature is a characteristic of visible light that has important applications in lighting, photography, videography, publishing, manufacturing, astrophysics, etc. The color temperature of a light source is the temperature of an ideal black body radiator that radiates light of comparable hue to that of the light source. Color temperature is expressed in degrees Kelvin (K), the scientific temperature scale. Outdoor light, usually referred to as daylight, ranges from 4500K to 6200K. Indoor lighting, such as incandescent light, usually lies in the 2800K to 3400K. Office fluorescent lights range between 4000K and 7000K. In photography, knowing the color temperatures of the ambient light allows one to modify the color balance of an image to match the colors seen by the human eye.

Unlike the human eye, a camera typically does not have that ability to adjust for changes in color temperature due to differing types of ambient light (the light that is available in an environment). Color balancing changes the overall mixture of colors in an image and is used for color correction. Image data acquired by sensors (i.e., film or electronic image sensors) is transformed from the acquired values to new values that are appropriate for color reproduction or display on a screen of a computing device. Many factors can affect the color balance. For example, the colors sensed by camera may not match the colors seen by a human eye, the display medium may alter the color balance of the acquired image, and the ambient viewing conditions of the acquisition may differ from the display viewing conditions.

An image that is not color balanced is said to have a color cast, as at least some colors in the image appear to have been shifted towards one color or another, away from the actual colors. Color balancing may be thought in terms of removing a color cast. However, an important goal of a color balance adjustment is to render specific colors correctly, particularly neutral colors. Hence, the general method of color balancing is sometimes referred to in terms of neutral colors such as gray balancing, neutral balancing, or white balancing.

In some situations, it may be desirable to provide color correction to images captured by a camera on a mobile computing device under certain ambient lighting conditions. For example, it may be desirable to correct the color balance of images captured under incandescent lighting conditions. In some embodiments, the systems and methods described herein may provide color correction to a camera sensor and/or images captured under certain ambient lighting conditions by a camera sensor. For instance, the systems and methods described herein may allow for proper color calibration in relation to images captured from a camera on a mobile computing device in a variety of lighting conditions.

Figure 1:
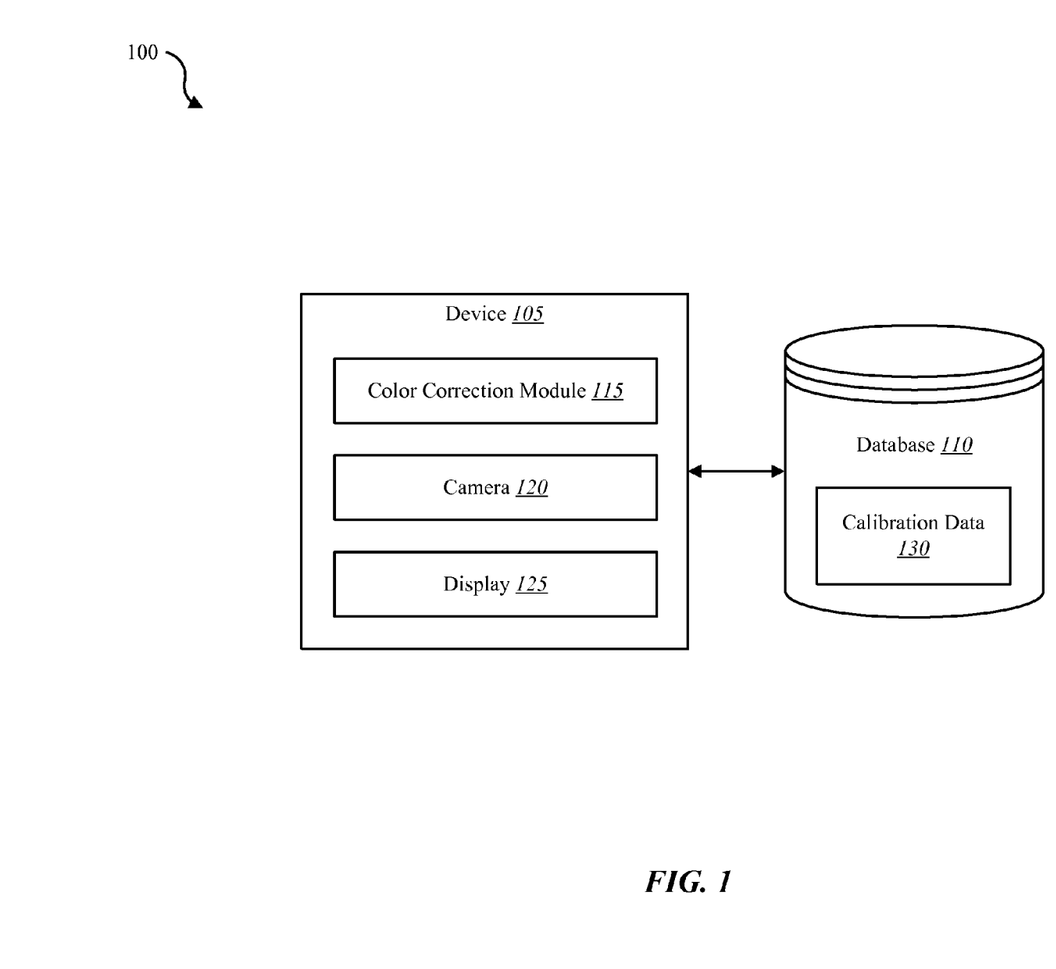
FIG. 1 is a block diagram illustrating one embodiment of an environment in which the present systems and methods may be implemented.

FIG. 1 is a block diagram illustrating one embodiment of an environment 100 in which the present systems and methods may be implemented. In some embodiments, the systems and methods described herein may be performed on a single device (e.g., device 105). For example, the systems and method described herein may be performed by a color correction module 115 that is located on the device 105. Examples of device 105 include mobile computing devices, smart phones, personal computing devices, computers, servers, etc.

In some configurations, a device 105 may include the color correction module 115, a camera 120, and a display 125. In one example, the device 105 may be coupled to a database 110. In one embodiment, the database 110 may be internal to the device 105. In another embodiment, the database 110 may be external to the device 105. In some configurations, the database 110 may include calibration data 130 used to provide color correction to a camera sensor (e.g., the camera sensor of camera 120) and/or images generated by the camera sensor.

In one embodiment, color correction module 115 may analyze one or more images captured using camera 120. In one example, the color correction module 115 may analyze an image, captured by the camera 120, that includes at least a portion of light emitted from the display 125. Based on the analysis of the captured image, the color correction module 115 may correct the color balance of the captured image. Alternatively, or additionally, the color correction module 115 may correct the color balance of the camera sensor that captured the image (e.g., adjust the color balance algorithm associated with the images generated by the camera sensor). For instance, in some embodiments, display 125 may emit a wavelength of light. In some embodiments, the wavelength of light emitted from display 125 may be derived from an ambient light source, display 125 including a reflective display or a transflective display, where at least a portion of the light emitted is from an ambient light source external to device 105. The color correction module 115 may instruct a user to position camera 120 of device 105 in relation to a mirror to allow camera 120 to capture an image of the wavelength of light emitted from display 125. Camera 120 may capture an image of the emitted wavelength of light from the reflection of emitted light that is reflected off the mirror.

Figure 2:
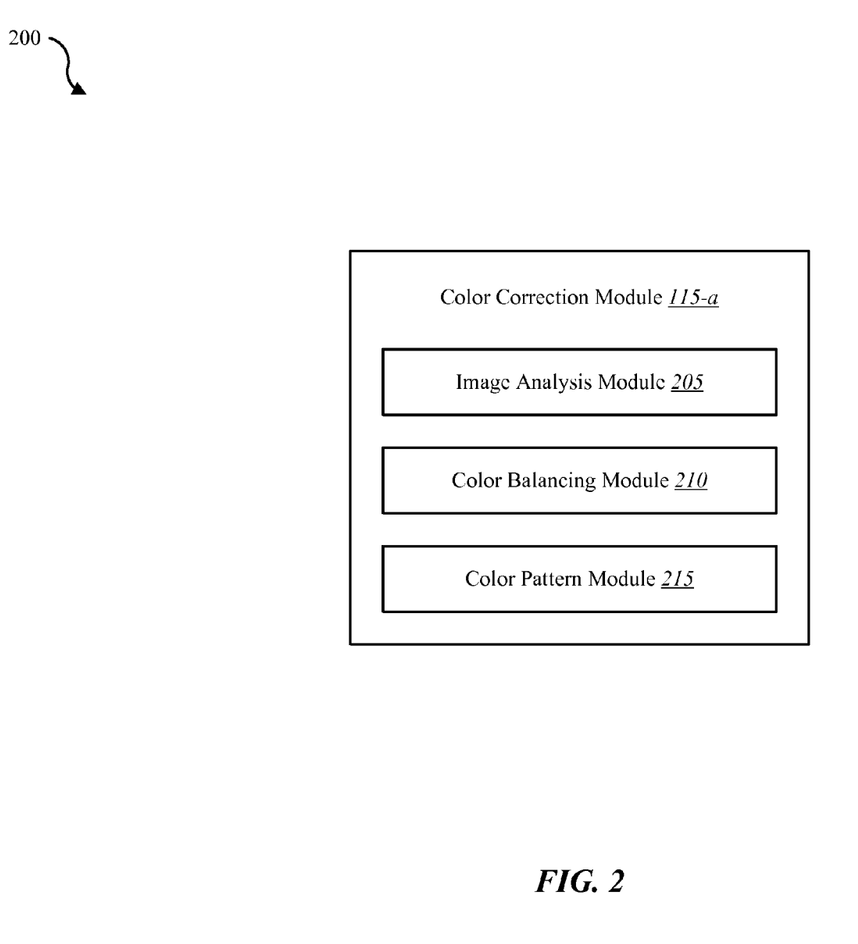
FIG. 2 is a block diagram illustrating one example of a color correaction module.

FIG. 2 is a block diagram illustrating one example of a color correaction module 115-a. The color correction module 115-a may be one example of the color correction module 115 illustrated in FIG. 1. The color correction module 115-a may include an image analysis module 205, a color balancing module 210, and a color pattern module 215.

In one embodiment the image analysis module 205 may analyze an image of light emitted from display 125 that is captured using camera 120. The analysis may include a comparison between two or more different images captured by camera 120. For example, image analysis module 205 may detect a difference between a predetermined color temperature of an internal light source of display 125 in relation to the detected color temperature of the light emitted from display 125, where the source of the emitted light includes at least a portion of ambient light. In one instance, the image may capture light emitted from display 125 that includes ambient light reflected on a surface of display 125. In some embodiments, the image may capture light emitted from display 125 that includes light generated from a light source internal to device 105. Alternatively, or additionally, the image may capture light emitted from display 125 that includes a mix of ambient light and light generated from a light source internal to device 105. Color pattern module 215 may emit a color pattern from display 125. In some embodiments, color pattern module 215 may emit two or more wavelengths of light simultaneously. Alternatively, or additionally, color pattern module 215 may emit two or more wavelengths of light in intervals and at least one wavelength of light per interval. Thus, image analysis module 205 may analyze two or more images (e.g., image of ambient light only, image of internal light only, and/or image of a mix of ambient and internal light) of one or more color patterns to determine a correction to a color imbalance in a captured image.

In one embodiment, color balancing module 210 may modify at least one image captured using camera 120 based on the analysis of the image performed by image analysis module 210. In some embodiments, color balancing module 210 may modify an aspect of a color-balance algorithm associated with a sensor from camera 120, where the color-balance algorithm is configured to adjust the color balance of captured images. In some embodiments, camera 120 may capture an image of a user in relation to capturing the image of the emitted light (e.g., image of the user captured before, during, or after the image of emitted light is captured). The color balancing module 210 may modify the image of the user based on the analysis of the image of emitted light performed by image analysis module 205.

Figure 3:
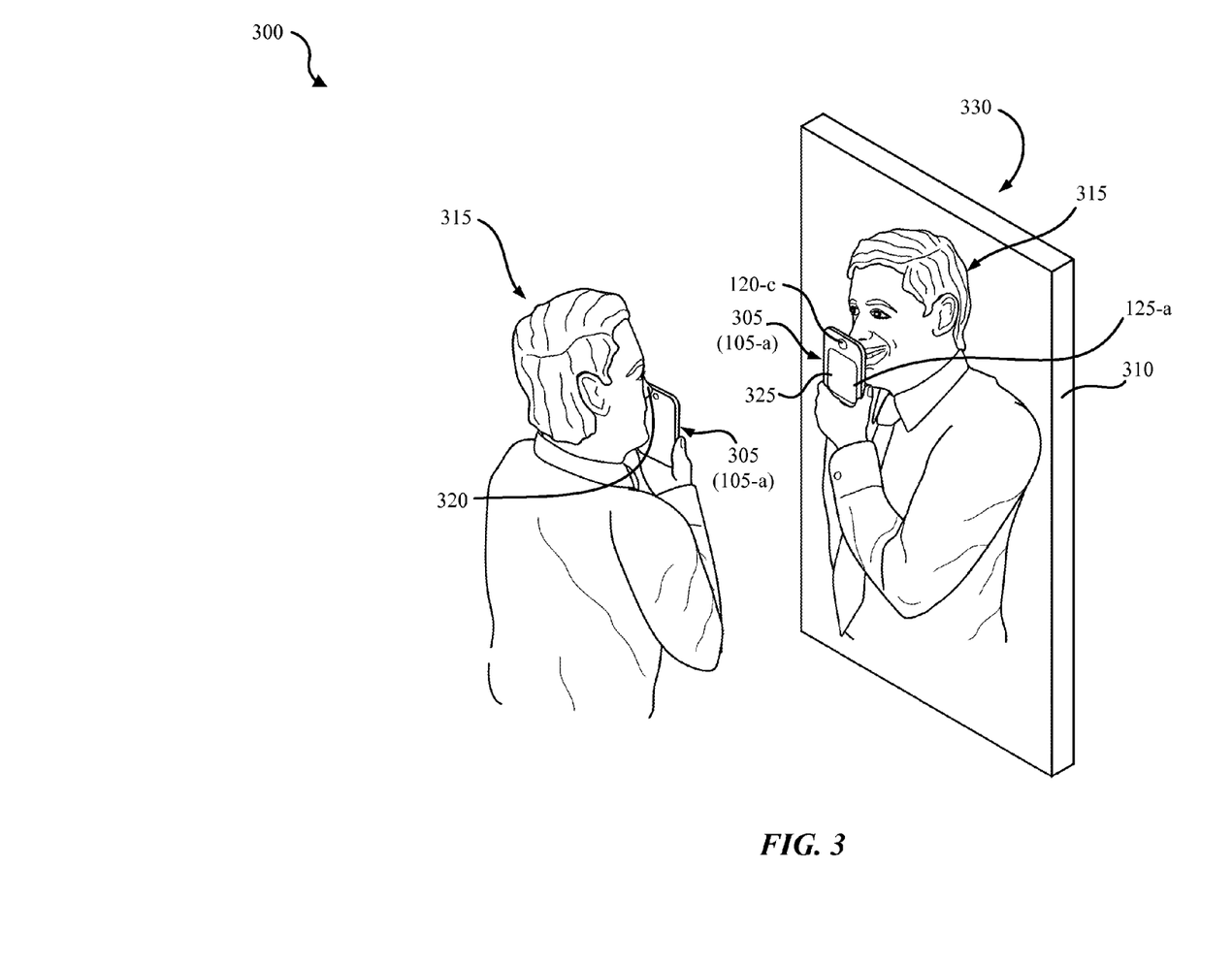
FIG. 3 illustrates an example arrangement for color balancing images captured by a camera.

FIG. 3 illustrates an example arrangement 300 for color balancing images captured by camera 120-*c*. In one embodiment, mobile computing device 305 acts as both a calibration input and a device 105-*a* that color balances images captured by camera 120-*c* based on the calibration input. For example, mobile computing device 305 may be an example of device 105 illustrated in FIG. 1 or 7. In this embodiment, a reflective surface (e.g., a mirror 310) or like device, may be used in conjunction with color balancing an image. In one example, the user 315 may hold mobile computing device 305 against a part of the face 320 of the user 315. The user 315 may position display 125-*a* and camera 120-*c* of mobile computing device 305 to face toward the mirror 310 so that the display 125-*a* and a color pattern 325 displayed by the display 125-*a* are visible in the mirror 310. In one embodiment, at least a portion of the light from the color pattern 325 includes light from an ambient light source. In some cases, the user may face the mirror 310 so that the user 315 is directly looking at the mirror 310 (so that both eyes and their associated pupils are visible in the mirror 310, for example) in order to capture a calibration input (e.g., color pattern 325) in relation to an image of the user 315.

The example arrangement 300 includes a depiction of a reflection 330 of the user 315 and the mobile computing device 305 within the mirror 310, the user being illuminated by an ambient light source. In some cases, the reflection 330 may include at least a portion of the user 315 (including the user's face and/or eyes, for example), at least a portion of the mobile computing device 305, the camera 120-*c*, the display 125-*a*, and/or the device specific color pattern 325 being displayed by the display 125-*a*. In at least some arrangements, the display 125-*a* shows a window frame that the user can see in the reflection 330 to make sure that the mobile computing device 305 and the user's face and/or eyes are within the picture being taken by handheld mobile computing device 305. The user 315 may then capture a picture (e.g., image) of the reflection 330 in order to calibrate one or more images of the user.

Figure 4:
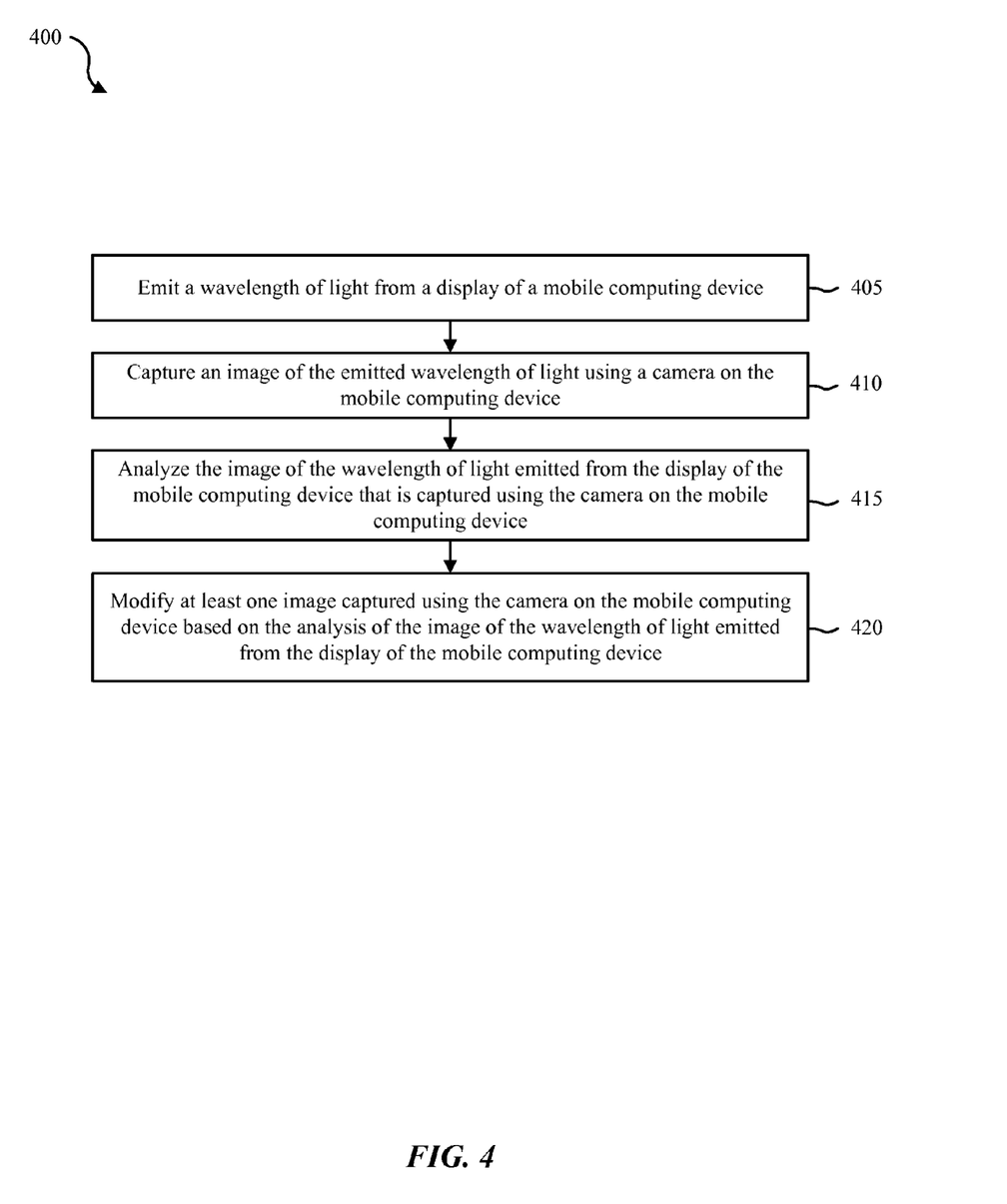
FIG. 4 is a flow diagram illustrating one example of a method for modifying a color balance of an image.

FIG. 4 is a flow diagram illustrating one example of a method 400 modifying a color balance of an image. In some configurations, the method 400 may be implemented by the color correction module 115 illustrated in FIG. 1, 2, or 7.

At block 405, a wavelength of light may be emitted from a display of a mobile computing device. At block 410, an image of the emitted wavelength of light may be captured using a camera on a mobile computing device. At block 415, the image of the wavelength of light emitted from the display of the mobile computing device captured using the camera on the mobile computing device may be analyzed. At block 420, at least one image captured using the camera on the mobile device may be modified based on the analysis of the image of the wavelength of light emitted from the display of the mobile device.

Figure 5:
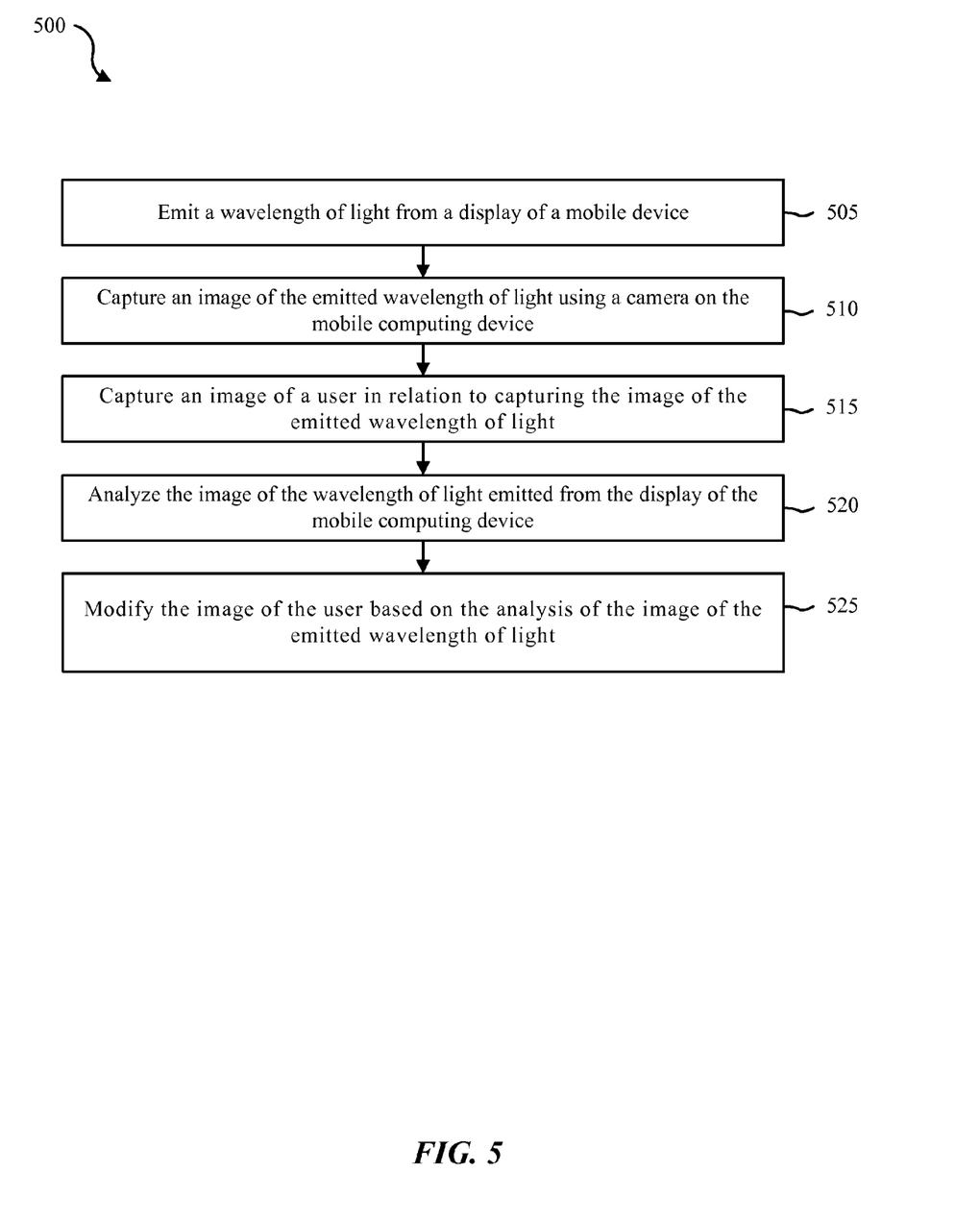
FIG. 5 is a flow diagram illustrating another example of a method for modifying a color balance of an image.

FIG. 5 is a flow diagram illustrating another example of a method 500 to scale a 3D model. In some configurations, the method 500 may be implemented by the color correction module 115 illustrated in FIG. 1, 2, or 7.

At block 505, a wavelength of light may be emitted from a display of a mobile device. At block 510, an image of the emitted wavelength of light may be captured using a camera on the mobile computing device. At block 515, an image of a user may be captured in relation to capturing the image of the emitted wavelength of light using the camera on the mobile device. At block 520, the image of the wavelength of light emitted from the display of the mobile device that is captured using the camera on the mobile device may be analyzed. At block 525, the image of the user may be modified based on the analysis of the image of the emitted wavelength of light.

Figure 6:
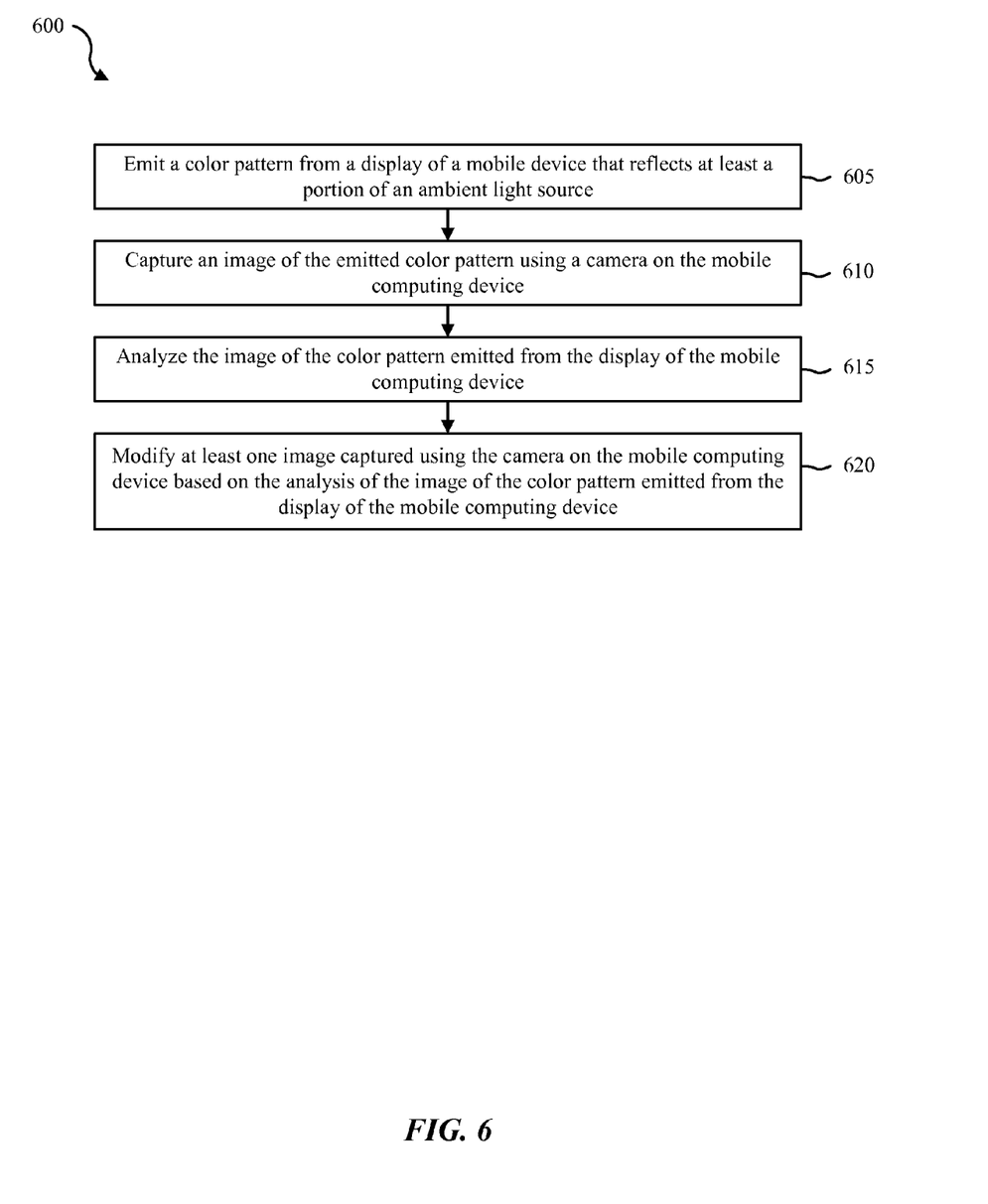
FIG. 6 is a flow diagram illustrating another example of a method for modifying a color balance of an image.

FIG. 6 is a flow diagram illustrating another example of a method 600 for modifying a color balance of an image. In some configurations, the method 600 may be implemented by the color correction module 115 illustrated in FIG. 1, 2, or 7.

At block 605, a color pattern may be emitted from a display of a mobile device that reflects at least a portion of an ambient light source. At block 610, an image of the emitted color pattern may be captured using a camera on the mobile computing device. At block 615, the image of the color pattern emitted from the display of the mobile computing device may be analyzed. At block 620, at least one image captured using the camera on the mobile computing device may be modified based on the analysis of the image of the color pattern emitted from the display of the mobile computing device.

Figure 7:
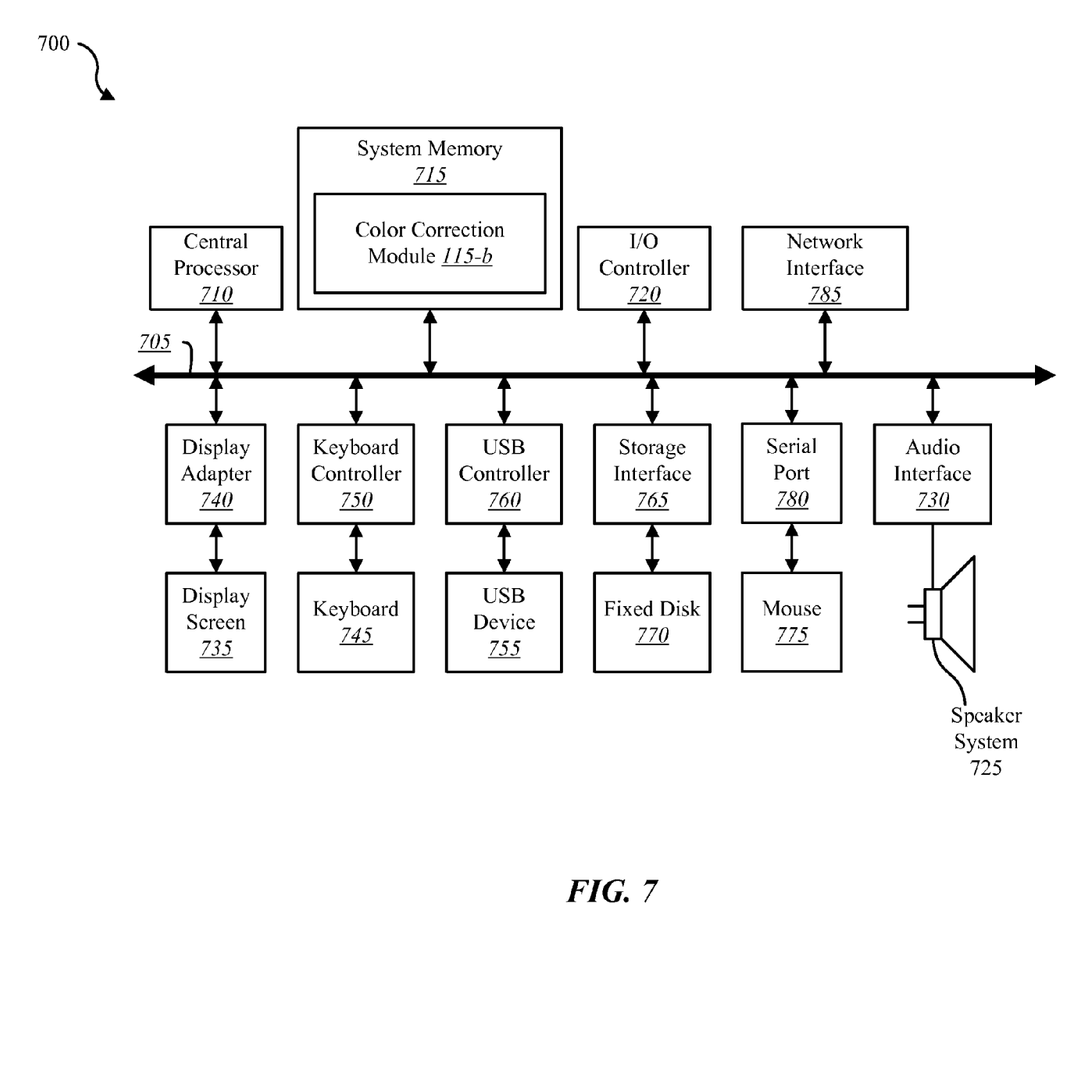
FIG. 7 depicts a block diagram of a computer system suitable for implementing the present systems and methods.

FIG. 7 depicts a block diagram of a computer system 700 suitable for implementing the present systems and methods. For example, the computer system 700 may be suitable for implementing the device 105 illustrated in FIG. 1 or 3. Computer system 700 includes a bus 705 which interconnects major subsystems of computer system 700, such as a central processor 710, a system memory 715 (typically RAM, but which may also include ROM, flash RAM, or the like), an input/output controller 720, an external audio device, such as a speaker system 725 via an audio output interface 730, an external device, such as a display screen 735 via display adapter 740, a keyboard 745 (interfaced with a keyboard controller 750) (or other input device), multiple universal serial bus (USB) devices 755 (interfaced with a USB controller 760), and a storage interface 765. Also included are a mouse 775 (or other point-and-click device) interfaced through a serial port 780 and a network interface 785 (coupled directly to bus 705).

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the color correction module 115-*b* to implement the present systems and methods may be stored within the system memory 715. Applications resident with computer system 700 are generally stored on and accessed via a non-transitory computer readable medium, such as a hard disk drive (e.g., fixed disk 770) or other storage medium. Additionally, applications can be in the form of electronic signals modulated in accordance with the application and data communication technology when accessed via interface 785.

Storage interface 765, as with the other storage interfaces of computer system 700, can connect to a standard computer readable medium for storage and/or retrieval of information, such as a fixed disk drive 744. Fixed disk drive 744 may be a part of computer system 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 7 need not be present to practice the present systems and methods. The devices and subsystems can be interconnected in different ways from that shown in FIG. 7. The operation of a computer system such as that shown in FIG. 7 is readily known in the art and is not discussed in detail in this application. Code to implement the present disclosure can be stored in a non-transitory computer-readable medium such as one or more of system memory 715 or fixed disk 770. The operating system provided on computer system 700 may be iOS®, MS-DOS®, MS-WINDOWS®, OS/2®, UNIX®, Linux®, or another known operating system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for color correcting images captured using a mobile computing device, the method comprising:
   emitting a wavelength of light from a display of a mobile computing device;
   capturing an image of the emitted wavelength of light using a camera on the mobile computing device positioned in relation to a mirror, wherein the mirror is external to the computing device, and wherein the captured image comprises a reflection of the wavelength of light emitted from the display of the mobile computing device on the mirror;
   analyzing the captured image of the reflection of the wavelength of light emitted from the display of the mobile computing device that is captured using the camera on the mobile computing device; and
   modifying at least one image captured using the camera on the mobile computing device based on the analysis of the captured image of the reflection of the wavelength of light emitted from the display of the mobile computing device.

2. The method of claim 1, further comprising:
   capturing an image of a user in relation to capturing the image of the emitted wavelength of light using the camera on the mobile computing device.

3. The method of claim 2, further comprising:
   modifying the image of the user based on the analysis of the image of the emitted wavelength of light.

4. The method of claim 1, further comprising:
   emitting a color pattern from the display of the mobile computing device.

5. The method of claim 4, wherein emitting the color pattern comprises emitting two or more wavelengths of light simultaneously.

6. The method of claim 4, wherein emitting the color pattern comprises emitting two or more wavelengths of light in intervals and at least one wavelength of light per interval.

7. The method of claim 1, wherein the display of the mobile computing device comprises at least one of a reflective display and a transflective display.

8. The method of claim 1, wherein the wavelength of light emitted from the display of the mobile computing device is derived from an ambient light source.

9. A computing device configured to color correct images captured using a mobile computing device, comprising:
   a processor;
   memory in electronic communication with the processor;
   instructions stored in the memory, the instructions being executable by the processor to:
      emit a wavelength of light from a display of a mobile computing device;
      capture an image of the emitted wavelength of light using a camera on the mobile computing device positioned in relation to a mirror, wherein the mirror is external to the computing device, and wherein the captured image comprises a reflection of the wavelength of light emitted from the display of the mobile computing device on the mirror;

analyze the captured image of the reflection of the wavelength of light emitted from the display of the mobile computing device that is captured using the camera on the mobile computing device; and modify at least one image captured using the camera on the mobile computing device based on the analysis of the captured image of the reflection of the wavelength of light emitted from the display of the mobile computing device.

10. The computing device of claim 9, wherein the instructions are executable by the processor to:

capture an image of a user in relation to capturing the image of the emitted wavelength of light using the camera on the mobile computing device.

11. The computing device of claim 10, wherein the instructions are executable by the processor to:

modify the image of the user based on the analysis of the image of the emitted wavelength of light.

12. The computing device of claim 9, wherein the instructions are executable by the processor to:

emit a color pattern from the display of the mobile computing device.

13. The computing device of claim 12, wherein the instructions executable by the processor to emit the color pattern include instructions executable by the processor to:

emit two or more wavelengths of light simultaneously.

14. The computing device of claim 12, wherein the instructions executable by the processor to emit the color pattern include instructions executable by the processor to:

emit two or more wavelengths of light in intervals and at least one wavelength of light per interval.

15. The computing device of claim 9, wherein the display of the mobile computing device comprises at least one of a reflective display and a transflective display.

16. The computing device of claim 9, wherein the wavelength of light emitted from the display of the mobile computing device is derived from an ambient light source.

17. A computer-program product for calibrating, by a processor, a camera, the computer-program product comprising a non-transitory computer-readable medium storing instructions thereon, the instructions being executable by the processor to:

emit a wavelength of light from a display of a mobile computing device;

capture an image of the emitted wavelength of light using a camera on the mobile computing device positioned in relation to a mirror, wherein the mirror is external to the computing device, and wherein the captured image comprises a reflection of the wavelength of light emitted from the display of the mobile computing device on the mirror;

analyze the captured image of the reflection of the wavelength of light emitted from the display of the mobile computing device that is captured using the camera on the mobile computing device; and modify at least one image captured using the camera on the mobile computing device based on the analysis of the captured image of the reflection of the wavelength of light emitted from the display of the mobile computing device.

18. The computer-program product of claim 17, wherein the instructions are executable by the processor to:

capture an image of a user in relation to capturing the image of the emitted wavelength of light using the camera on the mobile computing device; and modify the image of the user based on the analysis of the image of the emitted wavelength of light.

* * * * *